3,064,059
DEHALOGENATION OF HALOGENATED
AROMATIC COMPOUNDS
John P. Luvisi, Park Ridge, and Louis Schmerling, Riverside, Ill., assignors to Universal Oil Products Company, Des Plaines, Ill., a corporation of Delaware
No Drawing. Filed Oct. 23, 1959, Ser. No. 848,208
5 Claims. (Cl. 260—650)

This invention relates to a novel method for the dehalogenation of a halogenated aromatic compound and more particularly to a method for treating aromatic compounds containing at least one halogen atom on the ring whereby the final product contains at least one halogen atom less than the original halogenated aromatic compound.

The products which are obtained from the process of the present invention will find a wide variety of uses in the chemical field. For example, monochlorobenzene which may be obtained by dehalogenating a dichlorobenzene such as p-dichlorobenzene may be nitrated, the p-nitrochlorobenzene may then be reacted with ammonia to form p-nitroaniline, the latter compound then being reductively alkylated with ketones to form a wide variety of substituted N,N'-dialkyl-p-phenylenediamines, these compounds being useful as antioxidants and antiozonants. In addition to preparing products which are used as intermediates in the preparation of antioxidants and antiozonants of the type hereinbefore set forth it is also possible to prepare compounds which are useful as intermediates in the preparation of insecticides, those halogenated aromatic compounds containing chlorine being especially effective therefor.

It is therefore an object of this invention to provide a method for preparing aromatic compounds containing substituents which are useful as intermediates in the preparation of other organic chemicals.

A further object of this invention is to provide a method whereby an aromatic compound containing at least one halogen atom on the ring may be at least partially dehalogenated to form aromatic compounds containing at least one halogen atom less than the original compound.

One embodiment of this invention resides in a method for the dehalogenation of an aromatic compound containing at least one halogen atom on the ring which comprises treating said compound with water at an elevated temperature to form an aromatic compound containing at least one halogen atom less than the original halogenated aromatic compound.

A further embodiment of this invention is found in a method for the dehalogenation of an aromatic compound containing at least one halogen atom on the ring which comprises treating said compound with water and an inorganic acid at a temperature in the range of from about 50° to about 350° C. to form an aromatic compound containing at least one halogen atom less than the original halogenated aromatic compound.

Yet another embodiment of the invention is found in a method for the dechlorination of an aromatic compound containing at least one chlorine atom on the ring which comprises treating said compound with water and an inorganic acid at a temperature in the range of from about 50° to about 350° C. to form an aromatic compound containing at least one chlorine atom less than the original chlorinated compound.

A specific embodiment of the invention resides in a method for the dechlorination of p-dichlorobenzene which comprises treating said dichlorobenzene with water and hydrochloric acid at a temperature in the range of from about 275° to about 325° C. to form chlorobenzene.

Other objects and embodiments referring to alternative inorganic acids and to alternative halogenated aromatic compounds will be found in the following further detailed description of the invention.

As hereinbefore set forth it has now been found possible to dehalogenate an aromatic compound containing at least one halogen atom on the ring by treating said compound with water or with a mixture of water and an inorganic acid to obtain an aromatic compound containing at least one halogen atom less than the original compound. Aromatic compounds containing halogen substituents on the ring which may be dehalogenated according to the process of this invention includes those containing only carbon, hydrogen and halogen atoms (i.e., halogenated aromatic hydrocarbons) having an atomic weight of between 35 and 127 (i.e., chlorine, bromine and iodine) such as chlorobenzene, bromobenzene, iodobenzene, o-chlorotoluene, o-bromotoluene, o-iodotoluene, m-chlorotoluene, m-bromotoluene, m-iodotoluene, p-chlorotoluene, p-bromotoluene, p-iodotoluene, o-chloroethylbenzene, o-bromoethylbenzene, o-iodoethylbenzene, m-chloroethylbenzene, m-bromoethylbenzene, m-iodoethylbenzene, p-chloroethylbenzene, p-bromoethylbenzene, p-iodoethylbenzene, o-chloropropylbenzene, o-bromopropylbenzene, o-iodopropylbenzene, m-chloropropylbenzene, m-bromopropylbenzene, m-iodopropylbenzene, p-chloropropylbenzene, p-bromopropylbenzene, p-iodopropylbenzene, o-chloroisopropylbenzene, o-bromoisopropylbenzene, o-iodoisopropylbenzene, m-chloroisopropylbenzene, m-bromoisopropylbenzene, m-iodoisopropylbenzene, p-chloroisopropylbenzene, p-bromoisopropylbenzene, p-iosoisopropylbenzene, 4-chloro-o-xylene, 4-chloro-m-xylene, 2-chloro-p-xylene, 3-chloro-p-xylene, 4-bromo-o-xylene, 4-bromo-m-xylene, 2-bromo-p-xylene, 3-bromo-p-xylene, 4-iodo-o-xylene, 4-iodo-m-xylene, 2-iodo-p-xylene, 3-iodo-p-xylene, o-dichlorobenzene, o-dibromobenzene, o-diiodobenzene, m-dichlorobenzene, m-dibromobenzene, m-diiodobenzene, p-dichlorobenzene, p-dibromobenzene, p-diiodobenzene, 1,2,3-trichlorobenzene, 1,2,3-tribromobenzene, 1,2,3-triiodobenzene, 1,2,4-trichlorobenzene, 1,2,4-tribromobenzene, 1,2,4-triiodobenzene, 1,2,5-trichlorobenzene, 1,2,5-tribromobenzene, 1,2,5-triiodobenzene, 1,3,5-trichlorobenzene, 1,3,5-tribromobenzene, 1,3,5-triiodobenzene, 1-chloronaphthalene, 1-bromonaphthalene, 1-iodonaphthalene, 2-chloronaphthalene, 2-bromonaphthalene, 2-iodonaphthalene, 1,2-dichloronaphthalene, 1,2-dibromonaphthalene, 1,2-diiodonaphthalene, 1,4-dichloronaphthalene, 1,4-dibromonaphthalene, 1,4-diiodonaphthalene, 1,8-dichloronaphthalene, 1,8-dibromonaphthalene, 1,8-diiodonaphthalene, etc., the halogenated and polyhalogenated enthracenes, chrysenes, pyrenes, phenanthrenes, naphthacenes, etc. It is to be understood that the aforementioned halogenated aromatic compounds are only representatives of the class of compounds and that the present invention is not necessarily limited thereto.

The dehalogenation of the aforementioned halo-substituted aromatic compounds is effected by treating the compound in the presence of water and, if so desired, an inert inorganic acid such as hydrochloric acid, hydrobromic acid, sulfuric acid, nitric acid, phosphoric acid, etc., at an elevated temperature and pressure, the temperatures being in the range of from about 50° to about 350° C. or higher. The preferred temperature is in the range of from about 275° to about 325° C.

The process of the present invention may be effected in any suitable manner and may comprise either a batch or a continuous type operation. For example, when a batch type operation is used a quantity of the starting materials comprising the particular aromatic compound containing at least one halogen substituent on the ring is placed in a suitable apparatus such as a rotating autoclave along with the water and, if so desired, an inorganic acid. The apparatus is sealed, brought to the desired pressure and heated to the reaction temperature. Upon completion of the desired residence time the apparatus and contents thereof are allowed to cool to room temperature and the dehalogenated product is extracted with an organic solvent such as pentane, benzene, toluene, etc., which is immiscible with the water, separated from the water and recovered by conventional means such as factional distillation, crystallization, etc.

The reaction may also be effected in a continuous type operation. When this type of operation is used, the halogen substituted aromatic compound is continuously charged to a reaction zone which is maintained at the proper operating conditions of temperature and pressure. The reaction zone may comprise an unpacked vessel or coil or may be lined with an adsorbent packing material such as fire brick, alumina, dehydrated bauxite or the like. The water and, if so desired, the inorganic acid are also continuously charged to the reaction zone through separate lines. If so desired, either the water, or inorganic acid, or both may be admixed with the halogen substituted aromatic compound before entry into said reactor and the resulting mixture charged thereto in a single stream. Upon completion of the desired residence time the dehalogenated aromatic compound is continuously withdrawn from the reaction zone, separated from the reactor effluent, purified and recovered by conventional means while the residual effluent may be recycled to form a portion of the feed stock.

The following examples are given to illustrate the process of the present invention, which, however, are not intended to limit the generally broad scope of the present invention in strict accordance therewith.

*Example I*

In this example 29 g. (0.2 mole) of p-dichlorobenzene, and 200 cc. of water were placed in the glass liner of a rotating autoclave having a capacity of 850 cc. The liner was sealed into the autoclave and nitrogen pressed in until an initial pressure of 30 atmospheres had been reached. The autoclave was then slowly heated during about two hours to a temperature of about 300° C. and maintained at that temperature for a period of 10 hours during which time the maximum pressure in the autoclave reached 171 atmospheres. At the end of this time the autoclave and contents thereof were allowed to cool to room temperature, the final pressure at room temperature being 30 atmospheres. The excess pressure was vented and the product comprising 171 g. inside the liner and 30 g. outside the liner were recovered and combined. The organic products were extracted with pentane, the water was separated and the pentane extract was subjected to fractional distillation, the cut, boiling at 131–133° C. comprising chlorobenzene, being separated and recovered therefrom.

*Example II*

In this example 29 g. (0.2 mole) of p-dichlorobenzene along with 200 g. of water and 5 g. of concentrated hydrochloric acid were placed in the glass liner of a rotating autoclave similar to that used in Example I above. The liner was sealed into the autoclave and nitrogen pressed in until an initial pressure of 30 atmospheres had been reached. As in the preceding example the autoclave was then slowly heated to a temperature of 300° C. and kept at that temperature for a period of 10 hours, the maximum pressure during this residence time being 165 atmospheres. At the end of this time the autoclave and contents thereof were allowed to cool to room temperature, the final pressure at room temperature being 41 atmospheres. The excess pressure was vented and the reaction product comprising 79 g. inside the liner and 142 g. outside the liner were recovered and combined. The product was extracted with pentane, the water and hydrochloric acid were separated from the extract, the latter then being subjected to fractional distillation, the cut, boiling at 131–133° C. comprising chlorobenzene, being separated and recovered therefrom.

*Example III*

In this example 47 g. (0.2 mole) of p-dibromobenzene along with 200 cc. of water and 5 g. of concentrated hydrochloric acid are placed in a rotating autoclave similar to that used in the above examples. The liner is sealed into the autoclave and nitrogen pressed in until an initial pressure of approximately 30 atmospheres is reached. The autoclave is then heated at a temperature between 275° and 325° C. for a period of about 10 hours. At the end of this time the autoclave and contents thereof are cooled to room temperature, the excess pressure is vented and the reaction products both inside the liner and outside the liner are combined, extracted with pentane, the pentane extract is then subjected to fractional distillation, the cut boiling at 156 C. comprising bromobenzene, being separated and recovered therefrom.

*Example IV*

A mixture of 25 g. (0.2 mole) of p-chlorotoluene and 200 cc. of water are placed in an autoclave and subjected to the same conditions hereinbefore set forth in the preceding examples, that is, a temperature of approximately 300° C., an initial pressure of 30 atmospheres of nitrogen and a residence time of approximately 10 hours. At the end of this time the autoclave and contents thereof are allowed to cool to room temperature, the excess pressure is vented and the reaction products after extraction with pentane are subjected to fractional distillation, the cut boiling at 110° C., comprising toluene being separated and recovered therefrom.

*Example V*

In this example a mixture of 32 g. (0.2 mole) of 1-chloronaphthalene, 200 cc. of water and 5 g. of hydrochloric acid are treated in a manner similar to that set forth in the above examples. At the end of the desired residence time the autoclave and contents thereof are cooled to room temperature, the excess pressure is vented and the reaction product subjected to fractional distillation, the cut boiling at 218° C., comprising naphthalene being separated and recovered therefrom.

*Example VI*

A mixture of 22 g. (0.2 mole) of chlorobenzene and 200 cc. of water are treated in a manner similar to that set forth in the above examples. At the end of the residence time the reaction products are subjected to fractional distillation, the cut boiling at 80° C., comprising benzene, being separated and recovered therefrom.

We claim as our invention:

1. A method for the dehalogenation of an aromatic compound containing at least one halogen atom on the ring which consists in treating said compound with water and added hydrochloric acid at a temperature in the range of from about 50° to about 350° C. to form an aromatic compound containing at least one halogen atom less than the original halogenated aromatic compound.

2. A method for the dechlorination of p-dichlorobenzene which consists in treating said dichlorobenzene with water and added hydrochloric acid at a temperature in the range of from about 275° to about 325° C. to form chlorobenzene.

3. A method for the debromination of p-dibromobenzene which consists in treating said dibromobenzene with water and added hydrochloric acid at a temperature in the range of from about 275° to about 325° C. to form bromobenzene.

4. A method for the dechlorination of a chloronaphthalene which consists in treating said chloronaphthalene with water and added hydrochloric acid at a temperature in the range of from about 275° to about 325° C. to form a naphthalene containing at least one chlorine atom less than the original chloronaphthalene.

5. A method for the dechlorination of chlorobenzene which consists in treating said chlorobenzene with water and added hydrochloric acid at a temperature in the range of from about 275° to about 325° C. to form benzene.

References Cited in the file of this patent
UNITED STATES PATENTS 2,726,271   Troyan et al. _____ Dec. 6, 1955
2,949,491   Rucker _____ Aug. 16, 1960

OTHER REFERENCES

Mellor: "A Comprehensive Treatise on Inorganic and Theoretical Chemistry," Longmans, Green and Co., London, publ. (1923), vol. 3, pp. 160–1.